US011812697B2

(12) United States Patent
Torabi

(10) Patent No.: US 11,812,697 B2
(45) Date of Patent: Nov. 14, 2023

(54) PLANT TRIMMING ASSEMBLY

(71) Applicant: 2692330 Ontario Inc., Niagara Falls (CA)

(72) Inventor: Ali Torabi, Niagara on the lake (CA)

(73) Assignee: HAMILL AGRICULTURAL PROCESSING SOLUTIONS INC, Niagara Falls (CA)

( * ) Notice: Subject to any disclaimer, the term of this patent is extended or adjusted under 35 U.S.C. 154(b) by 499 days.

(21) Appl. No.: 17/120,137

(22) Filed: Dec. 12, 2020

(65) Prior Publication Data
US 2021/0185923 A1  Jun. 24, 2021

Related U.S. Application Data

(60) Provisional application No. 62/952,604, filed on Dec. 23, 2019.

(51) Int. Cl.
*A01D 46/00* (2006.01)
*A01G 3/00* (2006.01)

(52) U.S. Cl.
CPC ............ *A01D 46/005* (2013.01); *A01G 3/00* (2013.01); *A01G 2003/005* (2013.01)

(58) Field of Classification Search
CPC ... A01G 3/00; A01G 2003/005; A01D 46/005
See application file for complete search history.

(56) References Cited

U.S. PATENT DOCUMENTS

| 4,474,336 | A  | * | 10/1984 | Fleming | ............... | A01F 29/095 |
| | | | | | | 83/349 |
| 11,097,282 | B2 | * | 8/2021 | Hall | ..................... | B02C 23/18 |
| 2012/0279193 | A1 | * | 11/2012 | Mosman | .................. | A01G 3/00 |
| | | | | | | 56/233 |
| 2014/0196587 | A1 | * | 7/2014 | Beyerlein | ............... | A01G 3/00 |
| | | | | | | 83/331 |
| 2016/0219792 | A1 | * | 8/2016 | Singh | ..................... | A01F 29/095 |
| 2017/0164557 | A1 | * | 6/2017 | Harold | ................... | A01D 46/02 |
| 2018/0279564 | A1 | * | 10/2018 | McKellar | ............... | A01G 17/02 |
| 2019/0124851 | A1 | * | 5/2019 | Ingram | ................... | A01D 34/53 |
| 2019/0150367 | A1 | * | 5/2019 | Litwiller | ............. | A01G 17/023 |
| 2019/0246568 | A1 | * | 8/2019 | Seidel | .................... | A01G 3/002 |
| 2020/0246803 | A1 | * | 8/2020 | Faro | ...................... | B65G 43/08 |

* cited by examiner

Primary Examiner — Monica L Perry

(57) ABSTRACT

The present concept is a plant trimming assembly for trimming materials from plants and includes a frame, and a cylindrical slotted drum rotationally mounted to the frame along a longitudinal axis. The slotted drum includes an exterior surface and a longitudinally oriented internal passageway for receiving plant material there through. It further includes a longitudinally oriented cutting assembly retainer which is also rotationally mounted to the frame about the longitudinal axis such that it rotates concentrically around the outside of the exterior surface and along the length of the slotted drum. A longitudinally oriented blade is mounted to a cutting assembly which in turn is mounted to the cutting assembly retainer. The cutting assembly rotates in unison with the retainer around the outside of the exterior surface of the slotted drum. The cutting assembly is configured to maintain a pre-selected stand-off gap between a cutting edge of the blade and a circumferential contour of the exterior surface of the drum such that plant material projecting through a slot and beyond the stand-off gap will be trimmed off by the rotating blade cutting edge.

15 Claims, 13 Drawing Sheets

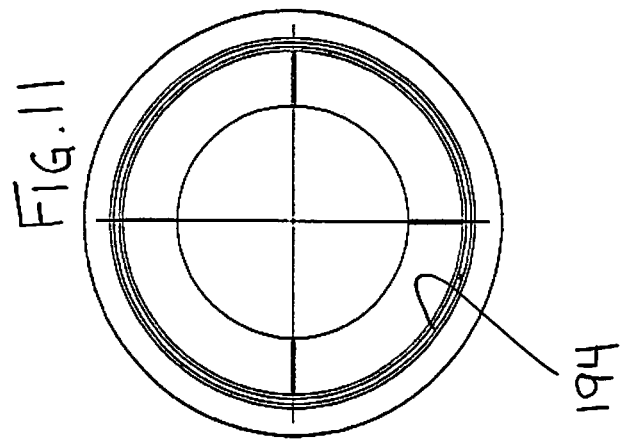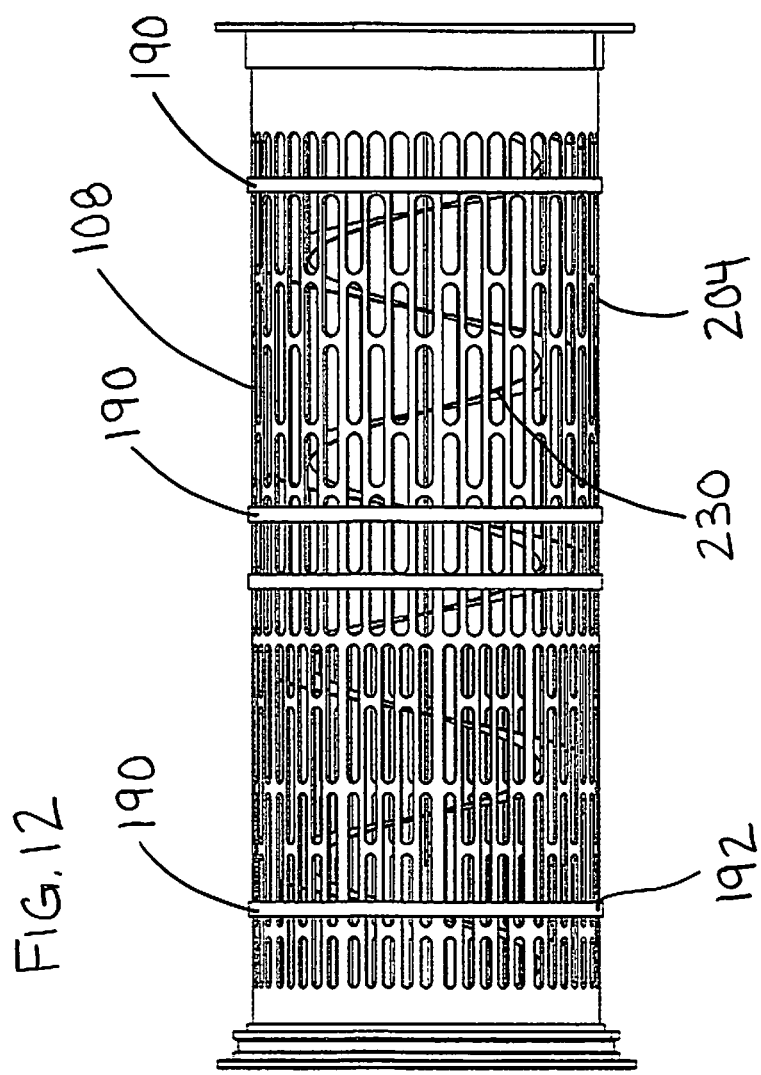

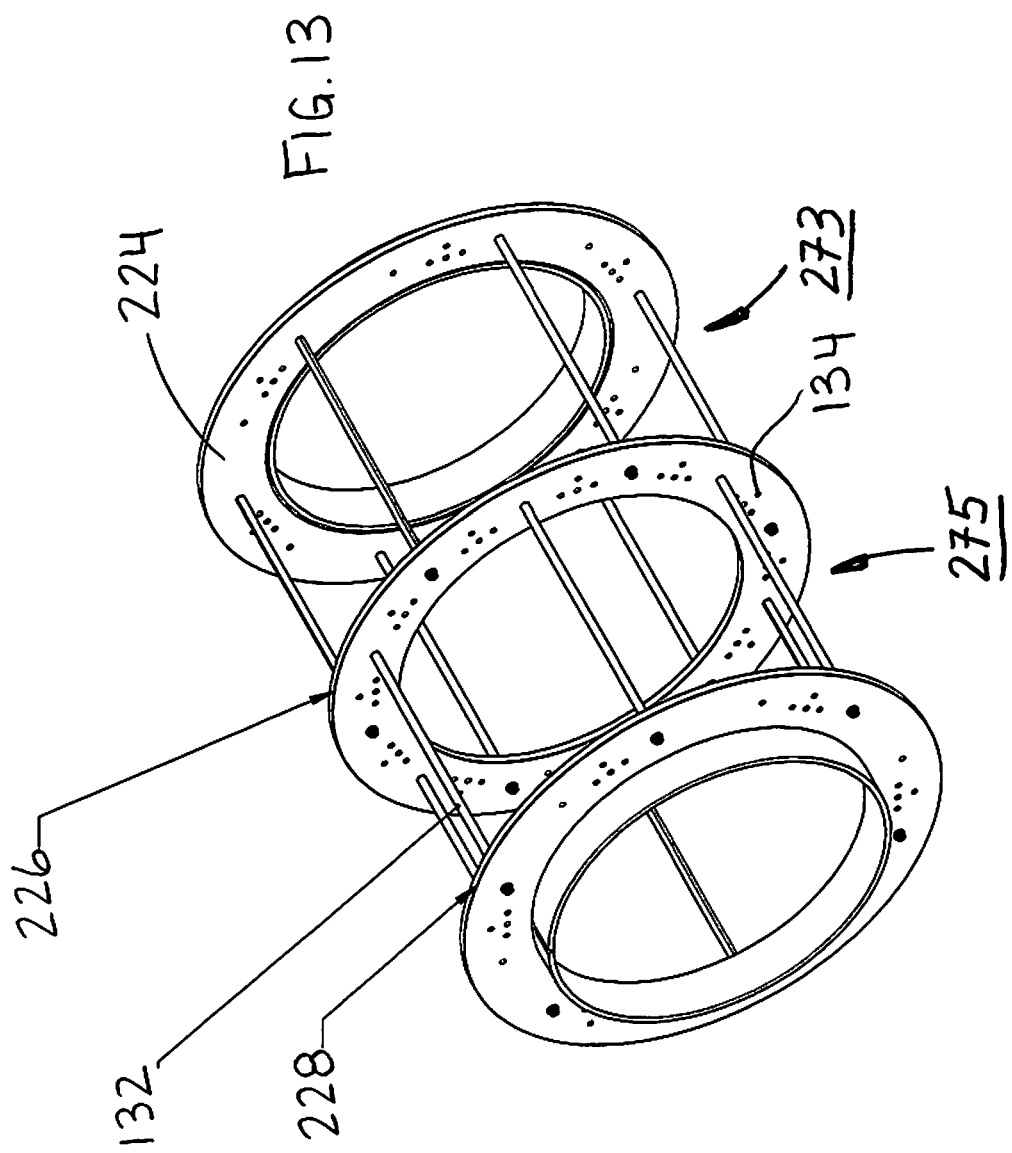

PLANT TRIMMING ASSEMBLY

FIELD OF THE INVENTION

This concept pertains to the trimming of plants and more particularly pertains to the trimming of plant buds and flowers and various other plant components.

BACKGROUND OF THE INVENTION

Plant trimming devices are used to trim and separate portions of a plant and/or a bud from other portions of the plant or bud. Traditional plant trimmers normally use a stationary blade to separate plant material. More recently there have been a number of machines and methods for cutting, trimming, and grinding plant materials for a variety of purposes such as for gardening, food processing, agriculture, and composting.

One such prior art device is described in US publication #2012/0279193 which is titled 'Method and Apparatus for Trimming Buds and Flowers' which was published on Nov. 11, 2012 by the inventor Donald Mosman. This device discloses a method for trimming plants, in particular buds and flowers, to remove unwanted plant material. The apparatus employs a combination of a slotted metal drum and a lawn mower type cutting reel that are rotated in the same direction but at different speeds to create a cutting interface that sheers the unwanted plant material off and then collects the debris through a novel vacuum manifold into a waste collection device. The publication describes a simple mechanical arrangement which allows adjustment of the cutting blades in relationship to the rotating drum in order to adjust the interface between the cutting blades and the drum to a claimed tolerance of between 0.002 and 0.006 inches. The inventors of the present application have learned that such simple mechanical adjusting mechanisms require frequent correction which creates significant downtime of the machine and unfortunately assumes that the slotted drum is relatively concentric and also that the cutting reel is relatively concentric. In practice it is difficult to maintain an adjustment between 2 to 6 thousandths of an inch using a simple mechanical stationary adjustment, as described in the Mosman publication.

In practice the inventors have found that the drums that are used in this type of machinery are never concentric and often exhibit run outs greater than 6 thousandths of an inch. This is a major reason maintaining a gap of 2 to 6 thousandths of an inch using the simple mechanical adjustment technique and mechanical arrangement described in the Mosman patent is difficult unless very expensive and practically cost prohibitive methods and materials are used to manufacture drums with extremely high precision.

Another piece of prior art is described in US publication #2017/0164557 entitled 'Plant Trimming Device' by the inventors Jacob Hawk Harold Et. al. which was published Jun. 15, 2017 and describes a plant trimmer which separates leaves or other peripheral plant material from the body portion of a plant. This publication also describes a rotatable basket having a set of ribs separated by openings in a basket side wall and a cutting assembly having at least one blade. The rotatable basket is configured to spin in the first direction and the cutting assembly may be configured to spin parallel to the rotatable basket in a second direction opposite the rotation direction of the basket. This disclosure describes how plant matter extending through one of the openings of the side wall of the rotatable basket may be sheered by the cutting face of the blade of the rotatable basket.

Two embodiments described in the Harold patent are depicted in FIGS. 11 through 12 which describe a rotatable basket which is positioned concentrically within a cutting assembly. The rotatable basket and the cutting assembly may be configured to counter rotate with respect to one another or they may be configured to rotate in the same direction but at different speeds. The rotation of the rotatable basket causes the plant material to extend through one or more of the openings in the basket and at that point engage the plant material that is extending from the opening with the rotating cutting assembly, thereby trimming off portions of the plant material.

Unfortunately, this disclosure does not go into any detail as to how the inventors intend on maintaining a certain separation or distance between the rotatable basket and the cutting assembly other than the use of some internal spacers which are depicted in FIG. 11b.

This disclosure suffers the same problems and issues that the disclosure in the Mosman patent described above have, namely that the rotatable basket is never perfectly concentric and round nor is it uniform along the longitudinal length of the basket and there's little within either of these disclosures that takes into account the dimensional variations around the outer circumference of the rotatable basket and along the length of the rotatable basket. In other words, there is no cost effective mechanism that can compensate for radial and longitudinal run outs between the blade and the rotatable basket in either of these two patent disclosures, other then producing an extremely precise basket or drum.

The inventors have found through extensive research and development with trials and testing that it is necessary to be able to hold very close tolerances between the cutting surface or the cutting blade and the exterior surface of the "slotted drum" as it is denoted in this application, or the "rotatable basket" as it is described in the Harold patent, or the "slotted drum" as it is described in the Mosman patent.

In this application the inventors will describe a very accurate novel method and apparatus for maintaining very close tolerances between the cutting blade and the exterior surface of the slotted drum.

SUMMARY OF THE INVENTION

The present concept plant trimming assembly for trimming materials from plants includes;
a frame;
a cylindrical slotted drum rotationally mounted to the frame along a longitudinal axis, the slotted drum includes an exterior surface and a longitudinally oriented internal passageway for receiving plant material there through;
a longitudinally oriented cutting assembly retainer is also rotationally mounted to the frame about the longitudinal axis such that it rotates concentrically around the outside of the exterior surface and along the length of the slotted drum;
a longitudinally oriented blade mounted to a cutting assembly which in turn is mounted to the cutting assembly retainer, the cutting assembly rotates in unison with the retainer around the outside of the exterior surface of the slotted drum; such that the cutting assembly is configured to maintain a pre-selected stand-off gap between a cutting edge of the blade and a circumferential contour of the exterior surface of the drum such that plant material projecting through a slot and beyond the stand-off gap will be trimmed off by the rotating blade cutting edge.

Preferably the concept further includes; at least two spaced apart guide cams mounted around the circumferential contour of the exterior surface of the drum; and at least two spaced apart cam followers each mounted to a distal end of the cutting assembly; wherein upon rotation of the cutting assembly retainer, the cam followers maintain contact with their respective guide cam in order to continuously maintain the pre-selected stand-off gap between the cutting edge of the blade and the circumferential contour of the exterior surface of the drum.

Preferably the guide cams are a flat band ring shaped strip guide cam with a flat inner side mounted to the circumferential contour of the exterior surface of the drum and a flat follower side for receiving the cam follower thereon.

Preferably the cam followers are rollers one operably connected to a left cam adjusting mechanism and the other to a right cam adjusting mechanism, the cam adjusting mechanisms attached to the distal ends of the blade.

Preferably wherein the cutting assembly further includes a floating blade assembly which rigidly holds the blade, wherein floating blade assembly is connected to the right and left cam adjusting mechanisms.

Preferably wherein the floating blade assembly includes a slotted blade support adjustably attached to a support holder with adjustment bolts for radially indexing the blade support relative to the support holder by turning the adjustment bolts, thereby selectively adjusting the blade longitudinal alignment to ensure blade alignment with the longitudinal contour of the exterior surface of the drum.

Preferably wherein the cutting assembly retainer includes longitudinally spaced apart disk shaped cutting assembly holders, the distance between two holders defines a segment which retains cutting assemblies there between, wherein the cutting assembly holders are held apart with longitudinally extending spacers.

Preferably the cutting assembly retainer is divided into at least two segments along the length of the drum thereby decreasing the length of each blade to substantially one half of the length of the longitudinal contour of the drum, thereby increasing the number of adjustable blades along the length of the drum which improves the accuracy to align the blades with the longitudinal contour of the drum.

Preferably wherein each segment includes at least two cutting assemblies evenly spaced around the circumference of the drum.

Preferably wherein the right cam adjusting mechanism is attached to a right cutting assembly bracket to which a first quick release mechanism is attached, and the left cam adjusting mechanism is attached to a left cutting assembly bracket to which a second quick release mechanism is attached, the quick release mechanisms for quick releasable attachment of the cutting assembly to the cutting assembly holders which provides for quick replacement of the cutting assembly and therefore the blade.

Preferably wherein the cam adjusting mechanisms include a compression spring 168 with one end of the spring operably attached to the support holder 146, a threaded spring guide 173 and a roller bracket 182 supporting the roller 172, and the other end of the spring is operably attached to the cutting assembly brackets 140, 142, wherein turning a spring guide nut 174 about the threaded spring guide 173 adjusts the stand-off 208 distance between the blade cutting edge and the drum exterior surface such that undulations in the drum circumferential surface are followed by the roller cam thereby maintaining the preselected stand-off gap.

Preferably wherein the quick release mechanism includes a spring biased pin slid-ably attached to the cutting assembly bracket, the pin engages with a pin aperture in the cutting assembly holder and thereby release ably attaches the distal end of the cutting assembly to its respective cutting assembly holder.

Preferably wherein the drum is attached to the frame with drum bearings and the retainer is attached to the frame with retainer bearings.

Preferably wherein the blade is rigidly attached to and sandwiched between a blade backer and the adjustable blade support.

Preferably wherein the blade is angled at an angle theta relative to a tangent of the circumference of the exterior surface of the drum.

BRIEF DESCRIPTION OF THE DRAWINGS

With the intention of providing demonstration of characteristics of the device or method, an example or examples are given below without restrictive character whatsoever with reference to the corresponding figures of preferred embodiments of the device and method as follows:

FIG. 11 is a schematic plan end view of the slotted drum shown in FIG. 12.

FIG. 12 is a schematic side elevational view of the slotted drum shown in FIG. 10.

FIG. 13 is a schematic isometric view of the cutting assembly retainer shown in FIG. 14.

DETAILED DESCRIPTION OF THE PREFERRED EMBODIMENTS

Figure 1:
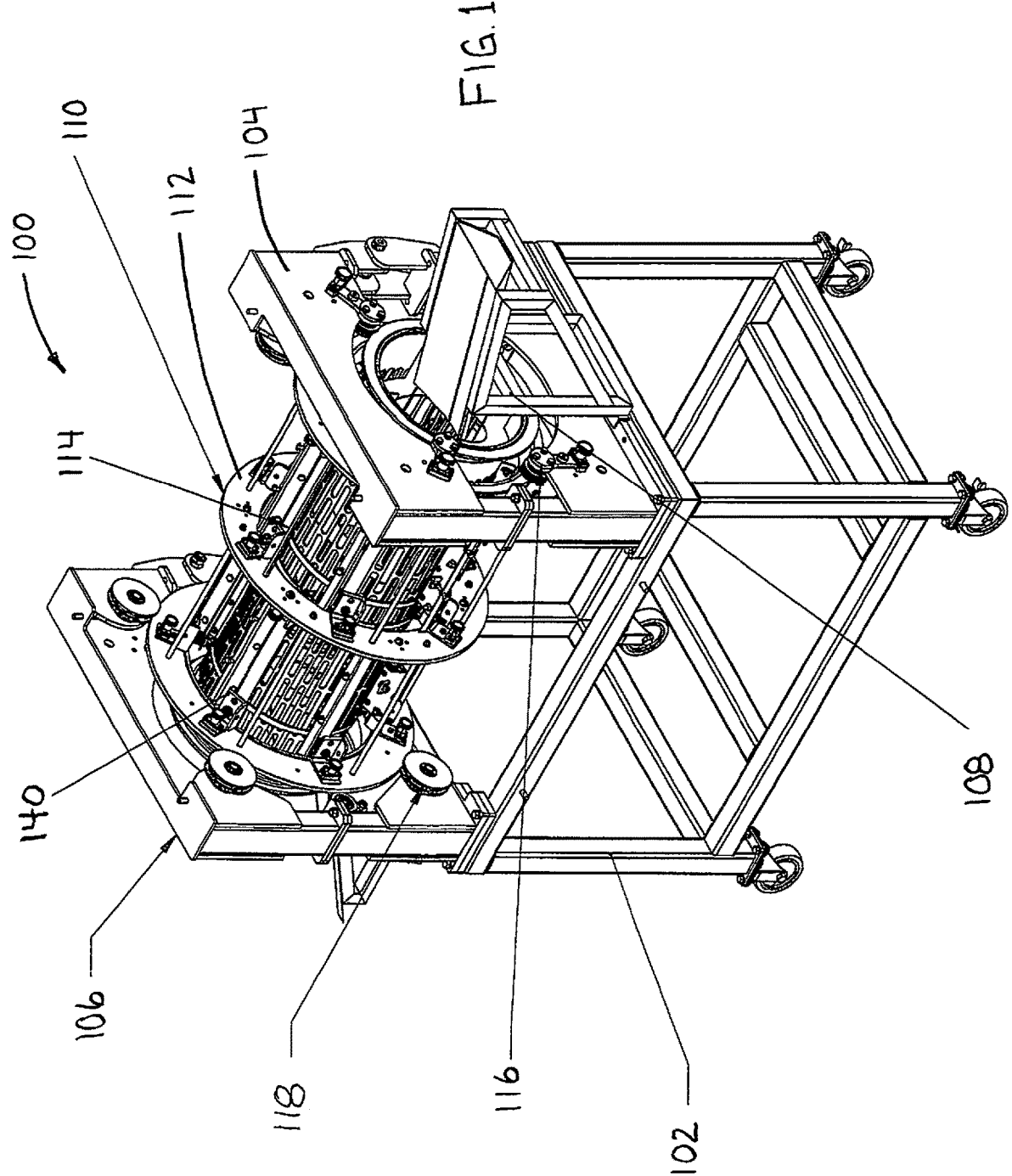
FIG. 1 is a schematic top isometric view of a plant trimming assembly.

Referring now to the attached FIGS. 1 through 15 which depict a plant trimming assembly 100 which is used for trimming materials from plants and includes the following major components namely a frame 102 which includes a front mounting frame bracket 104 and a rear mounting frame bracket 106.

The plant trimming assembly further includes a rotatable slotted drum 108 with a cylindrical exterior surface 204 which is supported by the mounting brackets 104 and 106 where in the slotted drum 108 is open on both ends.

The slotted drum 108 is adapted to receive plant material, not shown in the diagrams, namely at input ramp 120 and deliver plant material from the other end, namely at output ramp 122.

At least one cutting assembly 114 is attached to a rotatable cutting assembly retainer 110 which is rotatably supported by the mounting brackets 104 and 106.

A blade 154 is attached to the cutting assembly 114 and is mounted longitudinally and parallel to the cylindrical exterior surface 204 of the drum 108 and rotates around the exterior surface of the drum 108 with the cutting assembly retainer 110 where in the blade 154 cuts plant parts projecting through the slots 206 in the slotted drum 108.

The blade 154 is resiliently biased towards the exterior surface 204 of the slotted drum 108 with a compression spring 168. Right and left cam adjusting mechanisms 282 and 284 include a compression spring 168 with one end of the spring operably attached to the support holder 146, a threaded spring guide 173 and a roller bracket 182 supporting the roller 172, and the other end of the spring is operably attached to the cutting assembly brackets 140, 142, wherein turning a spring guide nut 174 about the threaded spring guide 173 adjusts the stand-off 208 distance between the blade cutting edge 156 and the drum or cylindrical exterior surface 204 such that undulations in the drum circumferential surface namely the circumferential contour is followed by the roller cam thereby maintaining the preselected stand-off 208 gap.

Cam followers 172 which are depicted as rollers are mounted to the cutting assembly 114 and follow band ring shaped strip guide cams 190 which are attached to the circumferential contour concentrically around the circumference of the exterior surface 204 of the drum 108. The cam followers 172 are configured to maintain a preselected standoff gap 208 between the cutting edge 156 of the blade 154 and the circumferential contour of the exterior surface 204 as the blades 154 rotate circumferentially around the exterior surface 204 of the drum 108. The "circumferential contour" is essentially the outer circumference of drum 108 however the circumference will always exhibit some degree of run out or out of roundness which is reflected in the use of the words circumferential contour The guide cams 190 of the plant trimming assembly are a flat ring shaped strip guide cam with a flat inner side 194 which is mounted adjacent to the circumferential contour of the exterior surface 204 of the drum 108 and a follower side 192 for receiving the cam follower 172 which is a roller thereon. Therefore the guide cam takes in the small variation namely the out of roundness and runout of the circumference of the drum.

The cam follower 172 is a roller cam follower 172 for rolling along the flat follower side 192 of guide cam 190. Therefore the cutting assembly 114 includes a floating blade assembly 160 which is resiliently mounted to right and left cutting assembly brackets 140 and 142 respectively such that the floating blade assembly 160 follows the contour of the flat follower side 192 of the guide cam 190. The cutting assembly brackets 140 and 142 are mounted to the assembly retainer 110.

The floating blade assembly 160 of plant trimming assembly 100 further includes a support holder 146 with a support surface 186 which is mounted to an adjustable blade support 148 and wherein the support holder 146 is resiliently connected to spring mounts 170 to the cutting assembly brackets namely right cutting assembly bracket 140 and left cutting assembly bracket 142.

The blade 154 is rigidly attached to and sandwiched between a blade backer 184 and the adjustable blade support 148. The blade support 148 is configured to adjustably align the blade 154 to the blade holder 146, and ultimately to the cylindrical exterior surface 204 in a longitudinal alignment. Similarly to the circumferential contour there is also a "longitudinal contour" which essentially is a longitudinal line along the length of the exterior surface of the drum which reflects the small variations in the diameter of the drum at any given point along its length. Unfortunately the drum longitudinal alignment of its exterior surface is not exactly true and smooth and straight but rather imperfect, and these imperfections are reflected in the term longitudinal contour The blade support 148 also includes alignment slots 150 and alignment bolts 152 for selectively aligning the blade 154 with the longitudinal contour of the exterior surface 204 and holding the blade 154 in the selected position by tightening the alignment bolts 152.

The blade 154 can also be angled at an angle theta 210 relative to a tangent 157 of the exterior surface 204 of the drum 108.

The cutting assembly retainer 110 includes spacers 13 to mount and space apart the ring-shaped cutting assembly holders 112 which retain cutting assemblies 114 there between. The cutting assembly holders 112 are held apart with spacers 132. The figures depict three cutting assembly holders namely input holder 224, center holder 226 and out put holder 228.

The cutting assembly 110 further includes a quick release mechanism 144 which are attached to the cutting assembly right and left brackets 140 and 142 respectively for quick release attachment of the cutting assembly 114 from the cutting assembly holders 112. This quick release mechanism 144 includes a pin 136 which engages resiliently with a pin aperture 134 in the cutting assembly holders 112.

In Use

Plant trimming assembly 100 therefore includes the following major components namely a frame 102 which has mounted thereon a slotted drum 108 and also a cutting assembly retainer 110 which has mounted thereon cutting assemblies 114. Slotted drum 108 is rotated via any suitable drive mechanism, in this case is depicted as drum drive pully 126 for use with a motor drive and a V-belt for rotating slotted drum 108 at a preselected speed.

Likewise cutting assembly retainer 110 includes a retainer pulley 124 for use with a motor and veebelt drive for rotating cutting assembly retainer 110 with its cutting assemblies 114 mounted thereon at a preselected speed.

The slotted drum 108 and the cutting assembly retainer 110 may be rotating in the same direction or may be counter rotating relative each other, however in both cases there will be a speed differential between the slotted drum 108 and the cutting assembly retainer 110 in order to ensure that the blades 154 are moving relative to cylindrical exterior surface 204.

Figure 2:
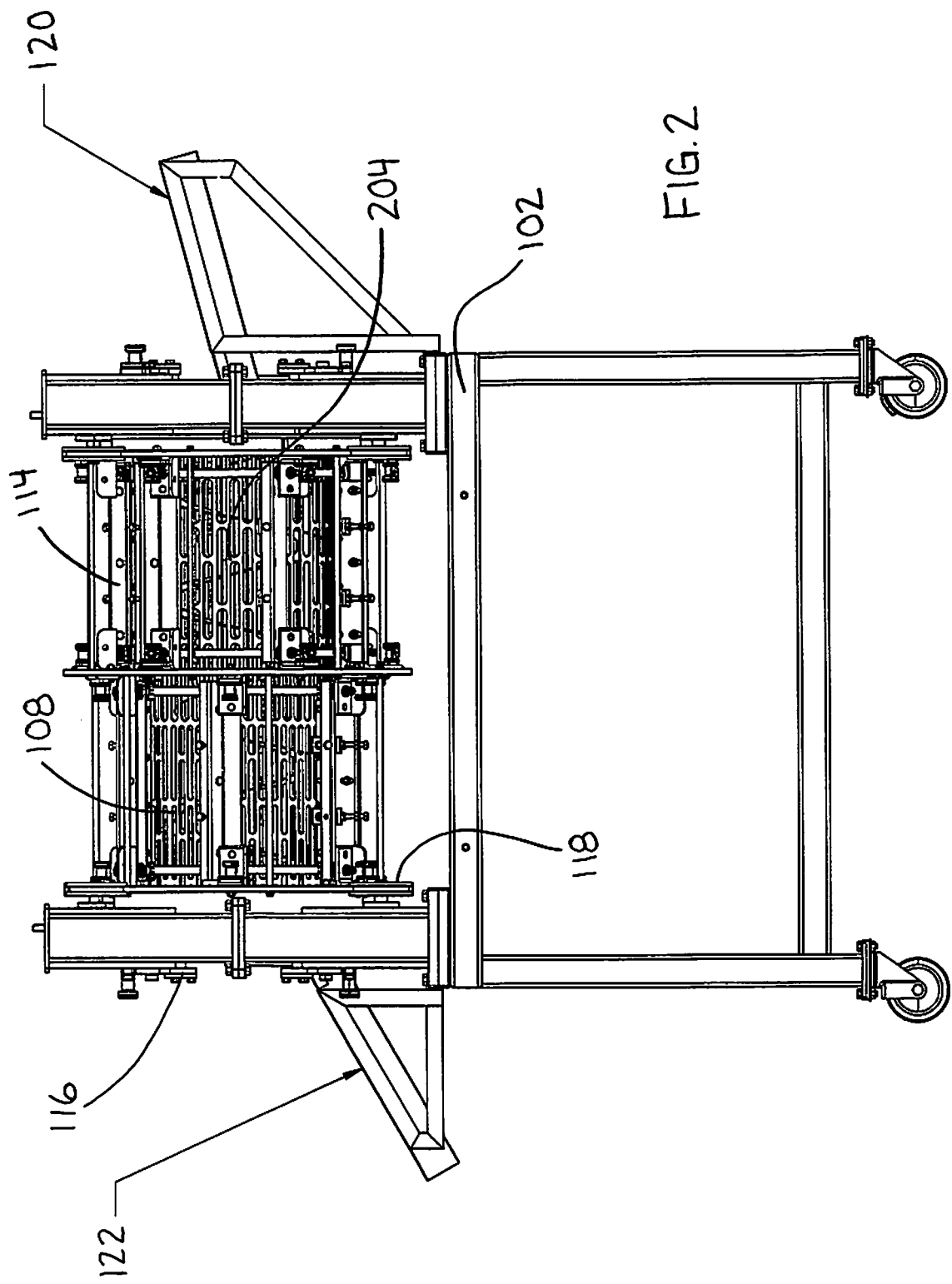
FIG. 2 is a side elevational view of the plant trimming assembly shown in FIG. 1.

Plant material is input into the plant trimming assembly 100 via input ramp 120 and into the open end of slotted drum 108 and moves along an internal passageway 280 in the drum. A spiral auger 230 and paddles 231 which is found within the internal passageway 280 of slotted drum 108 urges material along the longitudinal direction 216 of slotted drum 108 towards the output end 130 wherein material that manages to make it from the input end 128 to the output end 130 is dropped onto output ramp 122 as depicted in FIG. 2.

Slotted drum 108 is supported at the input end 128 at the input mounting flange 212 with drum bearings 116 and at the output end 130 at the output mounting flange 214 also by drum bearings 116. As depicted in FIG. 1 there are a total of four bearings which ride on the input mounting flange 212 and four bearings which ride on the output mounting flange 214 for rotatably mounting and holding slotted drum 108 in position.

Similarly cutting assembly retainer 110 is held in position at holder input rim 220 with retainer bearings 118 and at holder output rim 222 also by retainer bearings 118. Similar to slotted drum 108, cutting assembly retainer 110 is also supported by four retainer bearings 118 at input rim 220 and by four retainer bearings 118 at output rim 222. In this manner both the slotted drum 108 and the cutting assembly retainer 110 has the freedom to rotate about a central longitudinal axis which is common or concentric to both the slotted drum and the cutting assembly retainer.

Slotted drum 108 is cylindrical in shape and includes a cylindrical exterior surface 204 which has a variety of different sizes of slots 206 and a cylindrical exterior surface 204.

The inventors have found in practice that it is very difficult to produce a slotted drum 108 which is true meaning exhibits little to no runout in the transverse direction 218 namely a circumferential contour, and is 1764 straight and true along the longitudinal direction 216 namely a longitudinal contour, at a reasonable cost. In other words, it may be possible to make an almost perfectly concentric and true slotted drum 108 however the cost in producing such a drum becomes impractically high. Therefore, the inventors in this disclosure accept that there is a significant amount of non-trueness such as runout in the transverse direction and variations along the longitudinal length of the slotted drum 108. In other words there is a circumferential contour and a longitudinal contour.

The inventors have also found that it is very crucial that the distance between the cutting edge 156 of blade 154 and the cylindrical exterior surface 204 of slotted drum 108 must be maintained at an extremely tight tolerance of no more than 2 to 4 thousandths of an inch to maintain trouble free trimming of plant material which is projecting through the slots 206 of slotted drum 108. The gap or distance between the cutting edge 156 of the blade and the cylindrical exterior surface 204 is denoted as standoff gap 208 in FIG. 5 which is a magnified view depicting the almost imperceivably small gap between the cutting edge 156 and the cylindrical exterior surface 204.

The inventors have also found that in addition to the runout exhibited by the cylindrical exterior surface 204, the run out changes or varies as one moves from the input end 128 to the output end 130. For example at the input end which is proximate the input holder 224, the runout may be one value whereas the runout proximate the center holder 226 may be another value and the runout at the output holder 228 may be yet another value and therefore the runout conditions or amount of runout of the slotted drum 108 may vary as one moves from the input end 128 to the output end 130 along the longitudinal direction of slotted drum 108.

In order to maintain as consistent a standoff 208 as possible between the cutting edge 156 of blade 154 and the cylindrical exterior surface 204, a floating blade assembly 160 has been devised and created by the inventors which is depicted more particularly in FIGS. 6 through 9.

Cutting assemblies 114 which include the floating blade assembly 160 includes a blade 154 which is mounted longitudinally and parallel adjacent the cylindrical exterior surface 204 of slotted drum 108.

Figure 3:
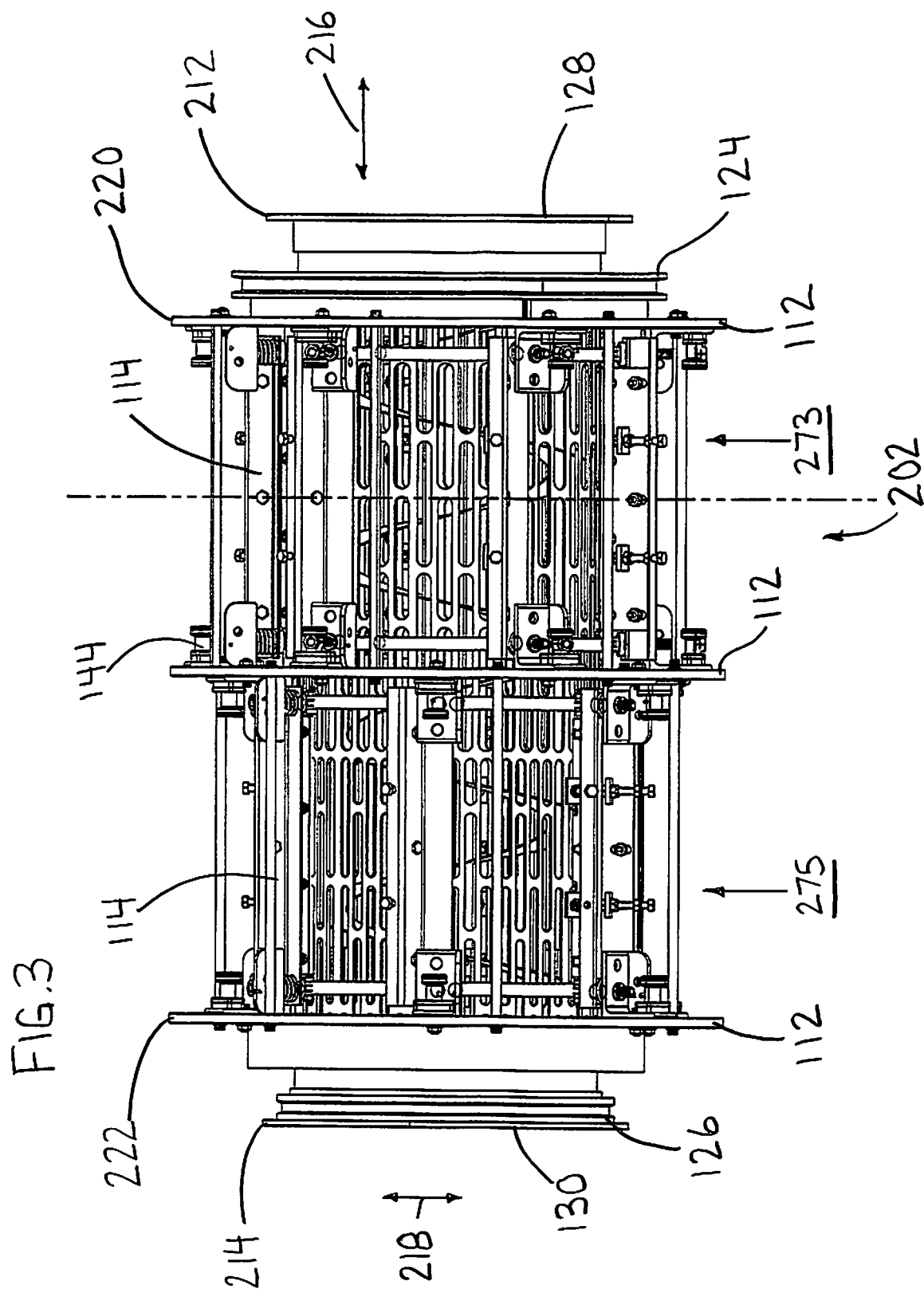
FIG. 3 is a schematic side elevational view of the slotted drum together with the retainer and cutting assemblies.
Figure 4:
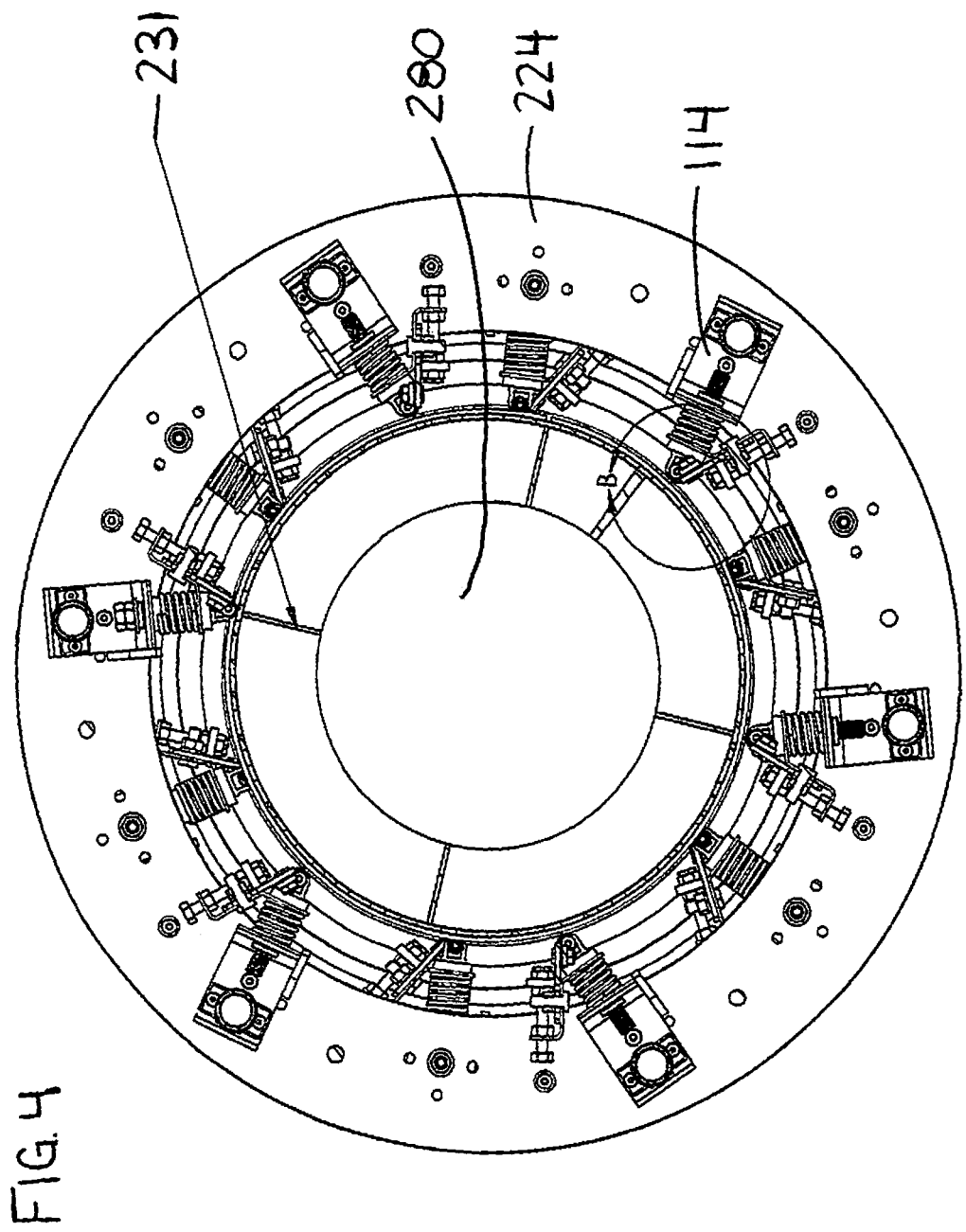
FIG. 4 is a cross sectional view taken along the dashed lines shown in FIG. 3 showing the slotted drum together with the cutting assemblies and the retainer.
Figure 5:
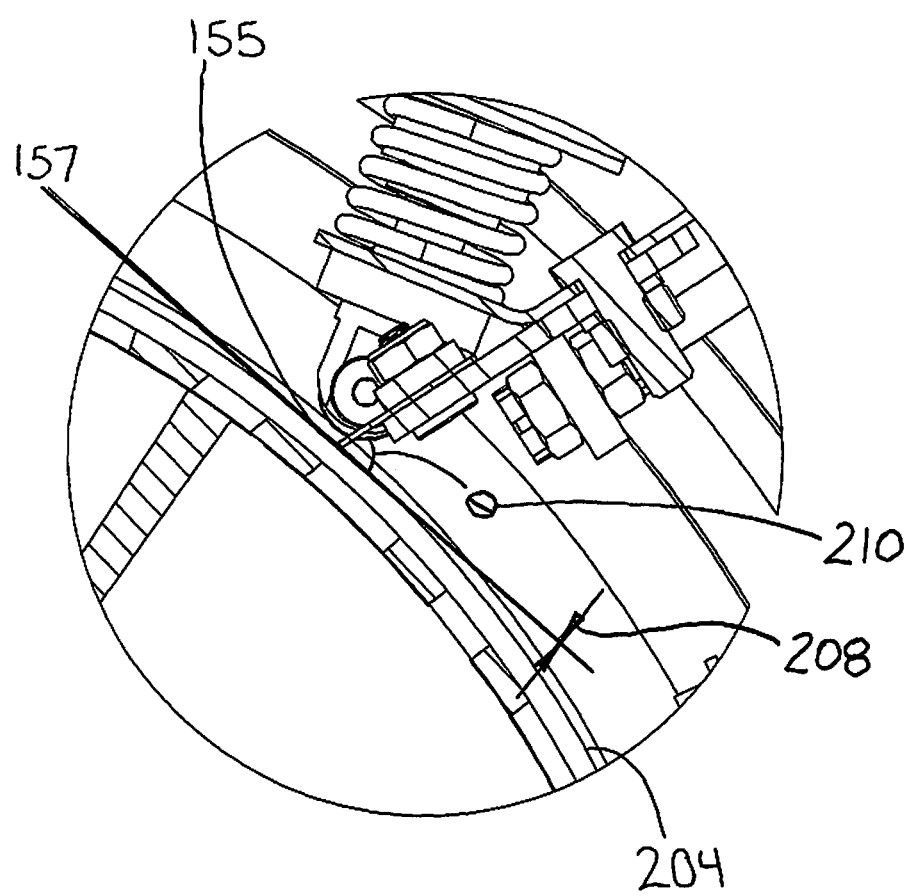
FIG. 5 is a magnified view showing the interface between the slotted drum and the blade and a portion of the cutting assembly.
Figure 14:
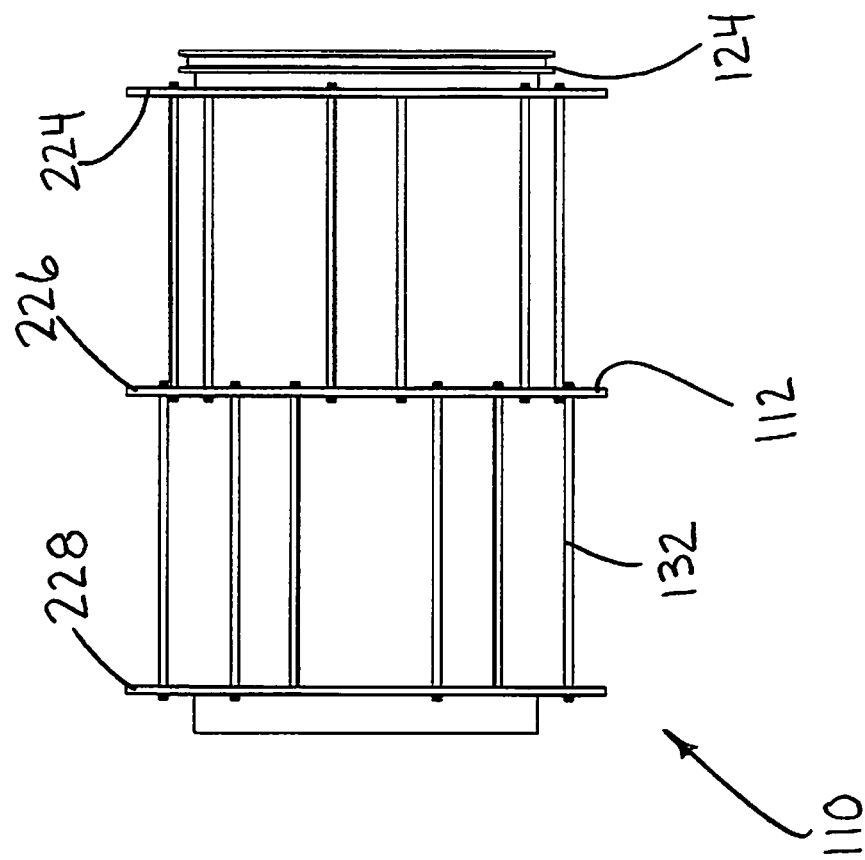
FIG. 14 is a side elevational schematic view of the cutting assembly retainer.
Figure 15:
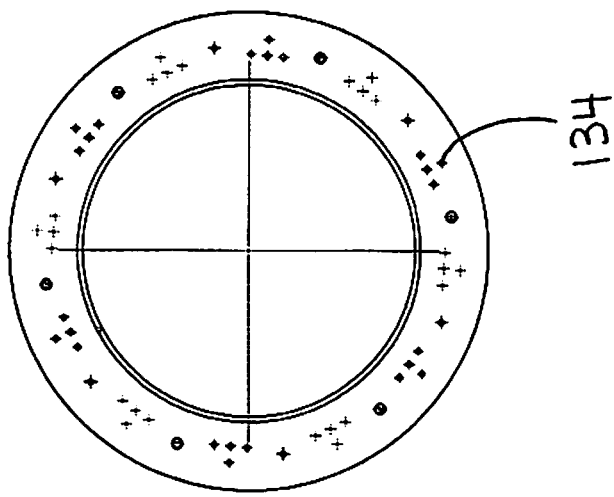
FIG. 15 is a schematic end view of the cutting assembly retainer shown in FIG. 14.

In FIGS. 3 13, and 14 the reader will note that two segments of cutting assemblies 114 are mounted to cutting assembly retainer 110. The first segment 273 of cutting assemblies 114 is mounted between the input holder 224 and the center holder 226 and the second segment 275 of cutting assemblies is mounted between the center holder 226 and the output holder 228. All of these cutting assemblies rotate about the slotted drum 108 in unison since they are securely mounted to cutting assembly retainer 110 which itself is rotating around slotted drum 108.

The trueness or the longitudinal contour of slotted drum 108 along the longitudinal direction 216 to some extent determines the number of sets of cutting assemblies 114 which are used along the longitudinal direction 216.

The greater the longitudinal variation of slotted drum 108, the more sets of cutting assemblies 114 will be needed since the greater number of sets for a given slotted drum 108 will reduce the length of blade 154 and therefore allow for more precise adjustment of the standoff gap 208 between the cutting edge 156 of blade 154 and the cylindrical exterior surface 204. At the extreme an infinite number of blades will allow for infinite adjustment.

Therefore the number of sets of cutting assemblies 114 will be affected by the absolute length of slotted drum 108 along the longitudinal direction 216 as well as the accuracy or the consistency of the runout along the length of the slotted drum 108. For example a very short slotted drum 108 or a highly consistent slotted drum 108 which has very uniform runout along the entire length of the longitudinal direction 216 may only require one set of cutting assemblies 114 rather than the two sets of cutting assemblies as depicted in the drawings.

The initial standoff gap 208 between the cutting edge 156 and the cylindrical exterior surface 204 along the longitudinal contour is adjusted using the alignment slots 150 in adjustable blade support 148 and is ultimately locked into position using the alignment bolts 152.

To help the user obtain a precise alignment, adjustment bolts 164 and stop nuts 166 are adjusted such that the proper circumferential contour standoff gap 208 is obtained between the cutting edge 156 of the blade 154 and the cylindrical exterior surface 204. The floating blade assembly 160 is connected to the right cutting assembly bracket 140 and left cutting assembly bracket 142 via a compression spring 168 which terminates one end at a cam follower namely depicted as a roller 172 on either end of the support holder 146. In the rest or the adjusting position, the blade cutting edge 156 is adjusted such that there is approximately a two thousandths per inch standoff gap 208 between the cutting edge 156 of blade 154 and the cylindrical exterior surface 204. As the cutting assembly retainer 110 rotates about a slotted drum 108 thereby rotating the cutting assemblies 114 about the slotted drum 108, the cam followers namely rollers 172 of the floating blade assembly 160 ride along flat follower side 192 of strip guide cams 190 which are rigidly mounted around the outer circumference of cylindrical exterior surface 204 as depicted in FIG. 11. The strip guide cams 190 closely follow the circumferential contour of the cylindrical exterior surface 204 and therefore adjust for runout which may be present in slotted drum 108. As the roller cam follower 172 rolls along flat follower side 192 of the strip (or radial) guide cam 190 causes the blade 154 (or radial) to move upwardly in the transverse direction or downwardly in the transverse direction in order to maintain a consistent standoff gap 208 between the cutting edge 156 of blade 154 and the cylindrical exterior surface 204.

In other words, as compression spring 168 is compressed and relaxed, it will maintain a consistent gap and/or a standoff gap 208 between the blade 154 and the cylindrical exterior surface 204.

Therefore, the reader will note that the floating blade assembly 160 essentially compensates for circumferential contour and longitudinal contour of the slotted drum 108 and maintains as consistent as possible standoff gap 208 between cutting edge 156 of blade 154 and the cylindrical exterior surface 204.

Eventually blade cutting edge 156 will wear and again a manual readjustment will be required. The tolerance or the standoff gap 208 consistency one is able to achieve with the presently described device we believe is significantly better and in many cases an order of magnitude better than any of the prior art devices known and/or described in the prior art. Put another way, a much greater circumferential contour and longitudinal contour can be tolerated and yet maintain a consistent stand off gap 208 compared to prior art devices.

In practice the inventors have found that they are able to hold a very close tolerance with a minimal amount of manual adjusting. The close tolerance has reduced gumming up of the blades significantly and overall improvements in efficiency of operation.

Typically the length of slotted drum 108 is 18 to 48 inches and preferably around 30 inches. Typically the diameter of slotted drum 108 is 6 to 24 inches and preferably around 12 inches. The dimensions may vary considerably however the inventor has found that a slot length of 3 to 8 inches and preferably about 5 inches works best and a slot width of 1 to ⅛ inches and preferably about ½ to ⅜ inches works best. Preferably the slot width is reduced from input end 128 of about ½ inch to the output end 130 of about ⅜ inch.

Figure 6:
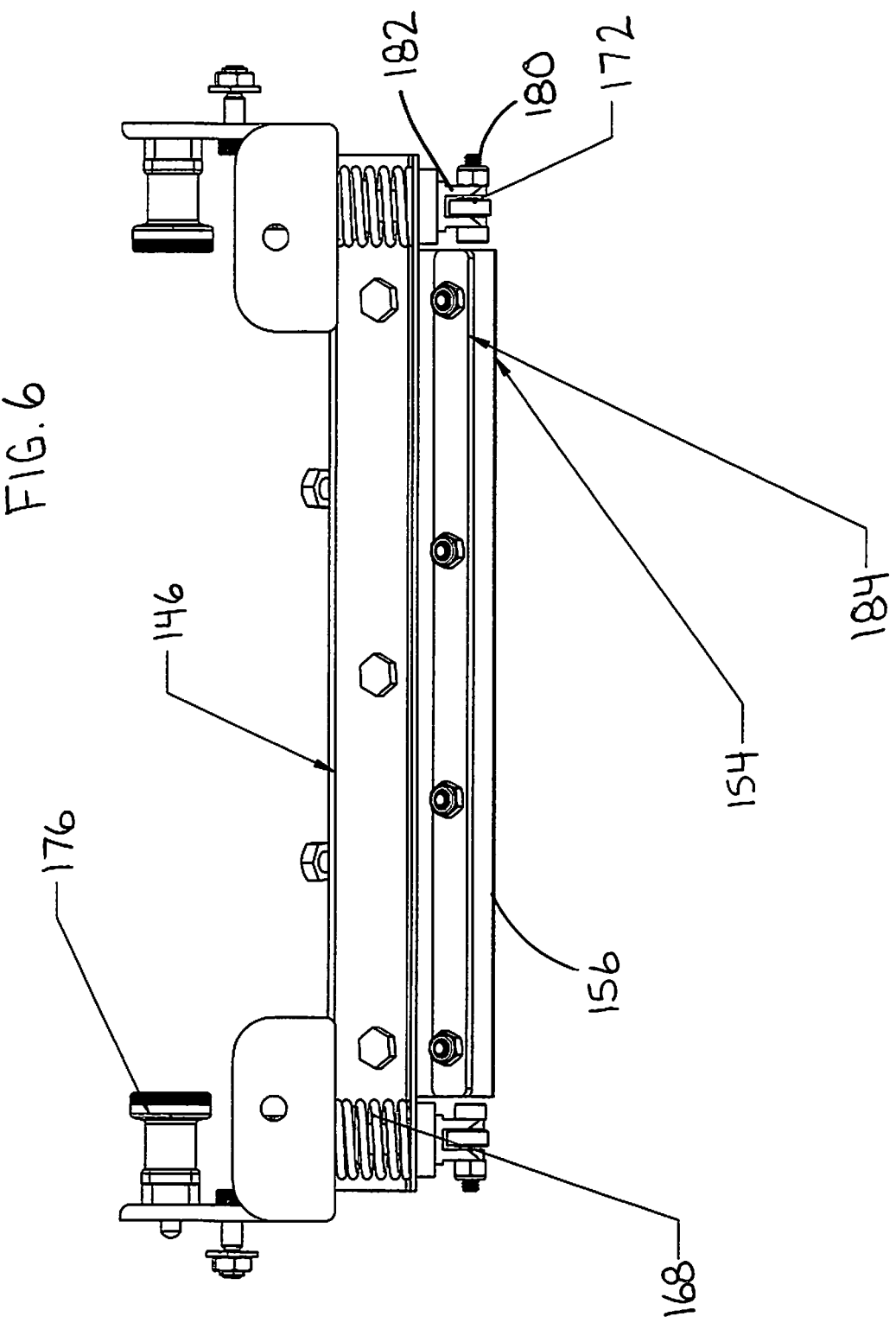
FIG. 6 is a front plan view of the cutting assembly.
Figure 7:
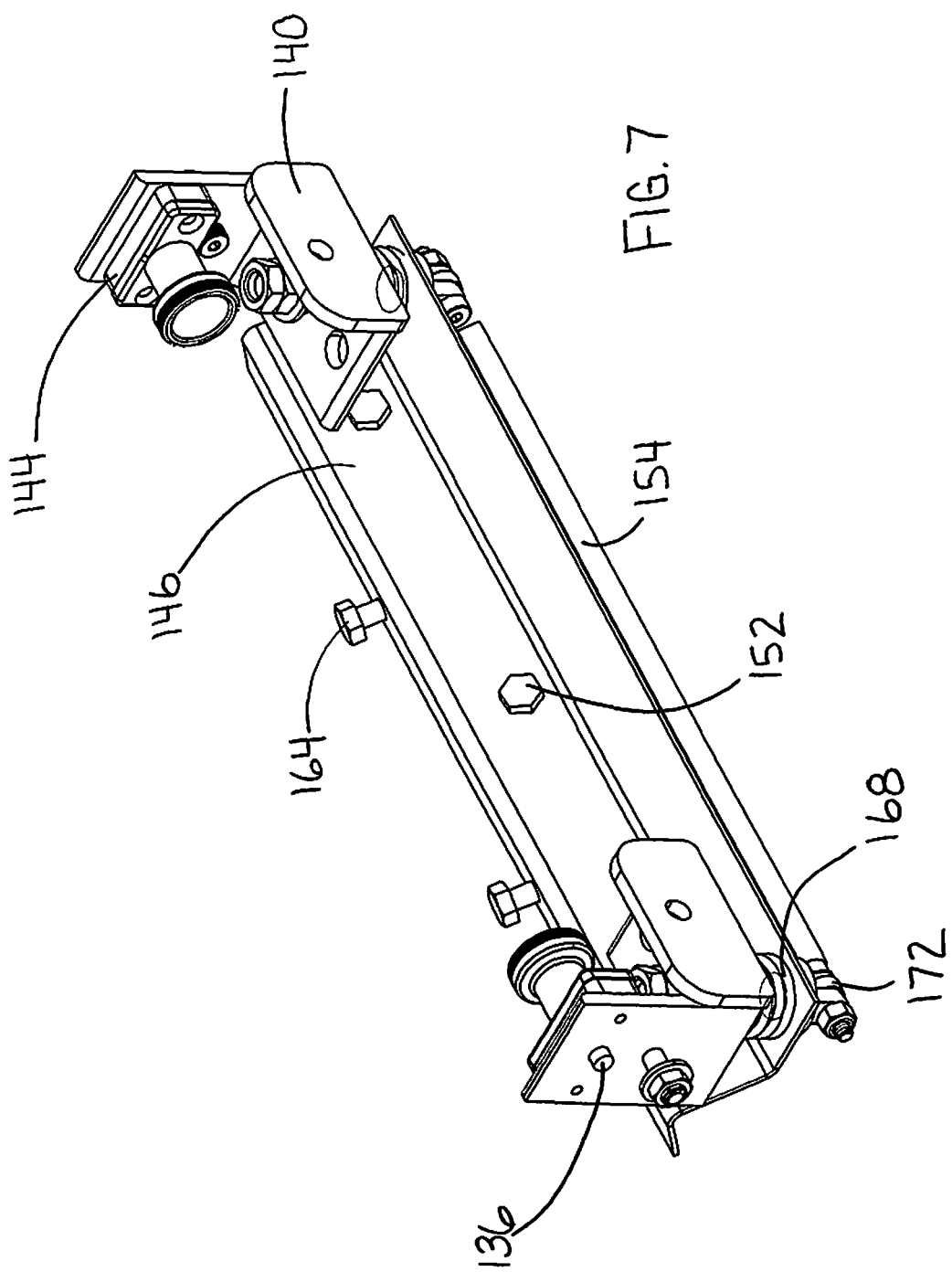
FIG. 7 is a schematic isometric front top view of the cutting assembly shown in FIG. 6.
Figure 8:
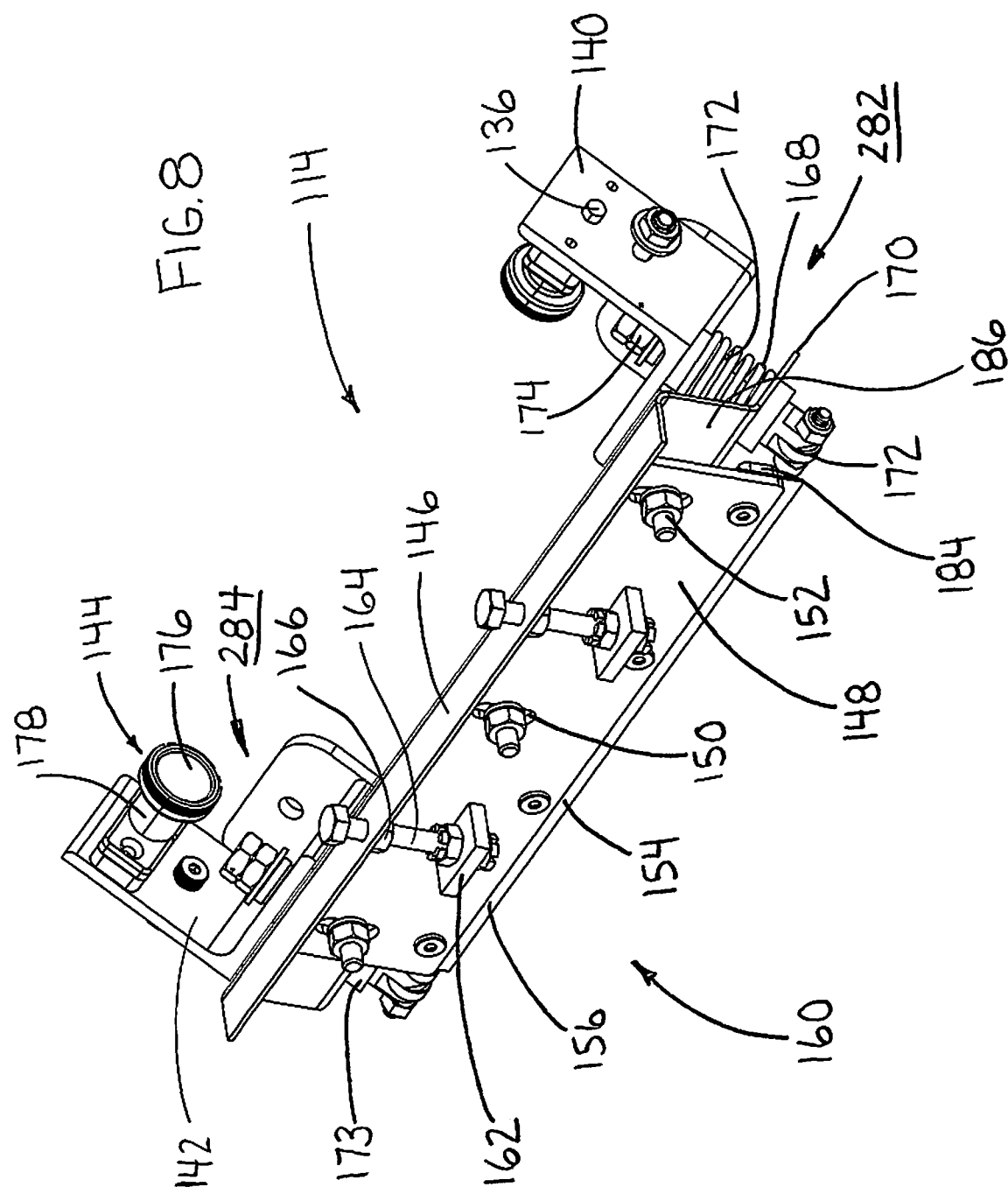
FIG. 8 is a schematic back isometric view of the cutting assembly shown in FIG. 6.
Figure 9:
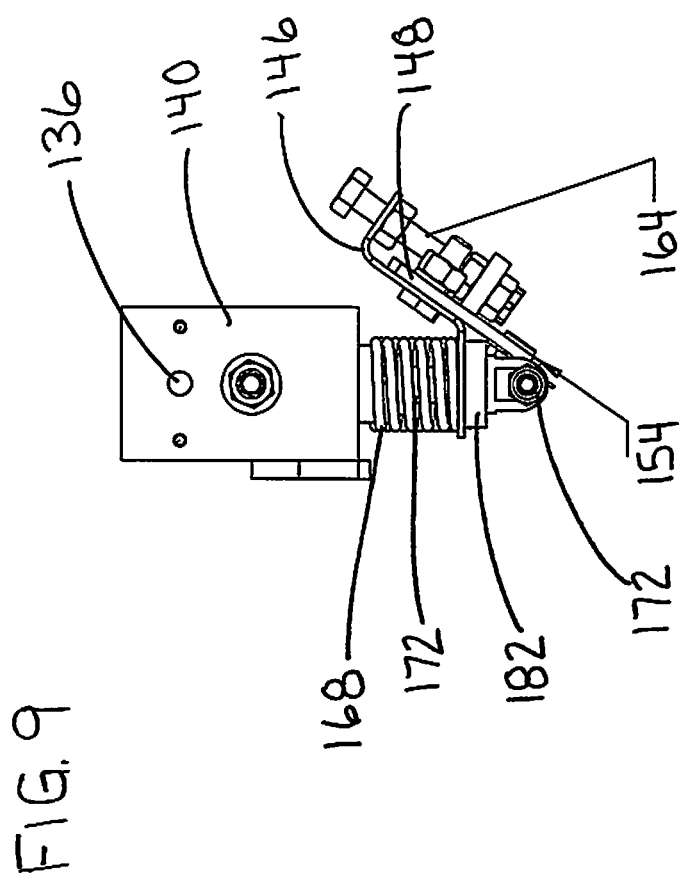
FIG. 9 is a schematic end view of the cutting assembly shown in FIG. 8.
Figure 10:
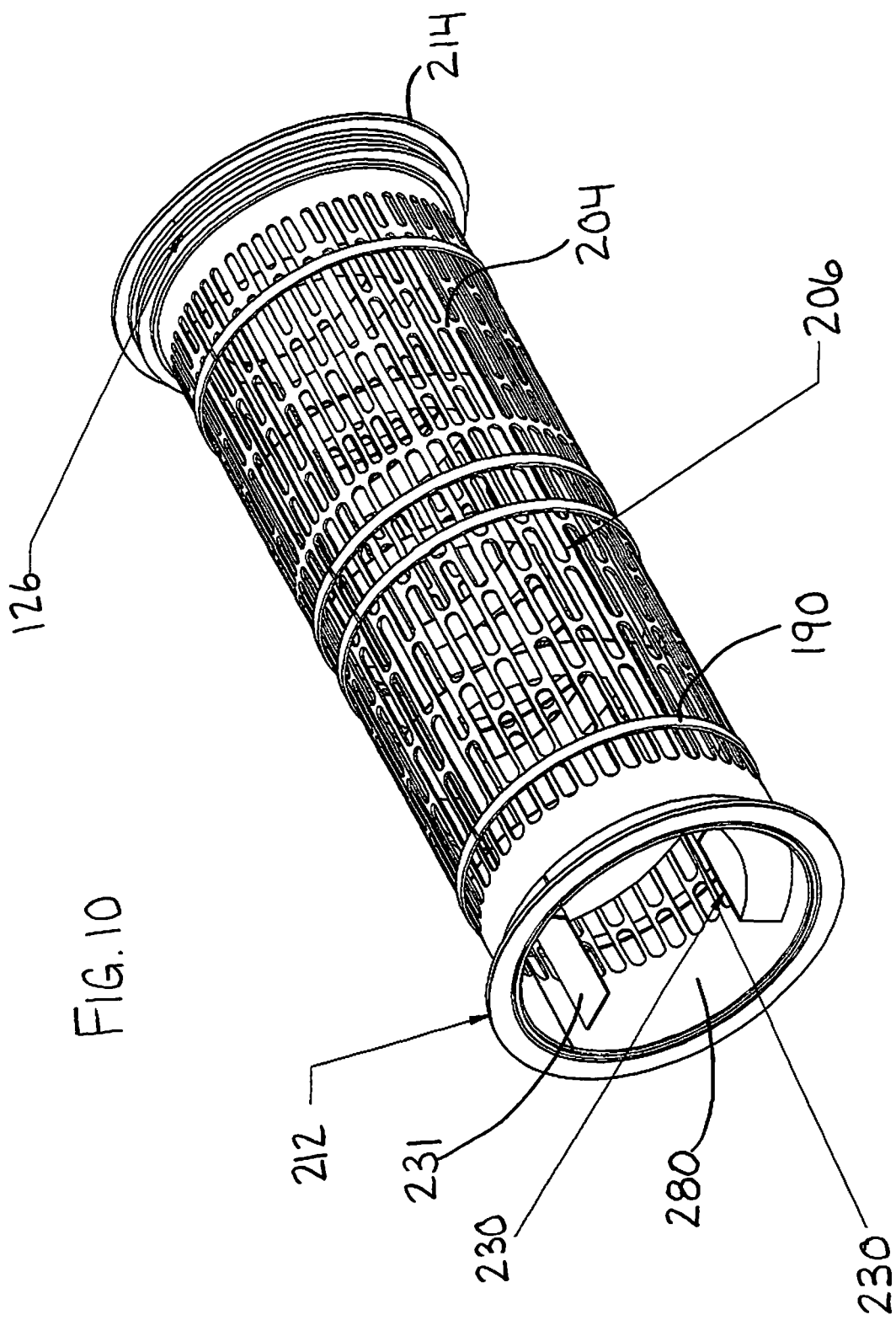
FIG. 10 is a schematic isometric view of the slotted drum.

The width of the cutting assemblies 114 may vary depending upon the dimensional uniformity of the slotted drum 108. In practice the width of cutting assembly 114 may range from 6 to 24 inches and preferably from 8 to 15 inches. As depicted in FIG. 6 the width of blade 154 is somewhat less than the width of the cutting assemblies 114 by about 2 to 5 inches.

The drum 108 and the cutting assemblies 114 which are mounted to the cutting assembly retainer 110 are driven by independent drives known in the art and not shown via drum drive pulley 126 and retainer drive pulley 124. The cutting assemblies 114 rotate at about 100 to 500 RPM and preferably at about 250 RPM. The drum 108 rotates at about 20 to 100 RPM and preferably at about 40 RPM.

The invention claimed is:

1. A plant trimming assembly for trimming materials from plants comprising;
   a) a frame;
   b) a cylindrical slotted drum rotationally mounted along a longitudinal axis to the frame, the slotted drum includes an exterior surface and a longitudinally oriented internal passageway for receiving plant material there through;
   c) a longitudinally oriented cutting assembly retainer is also rotationally mounted to the frame about the longitudinal axis such that it rotates concentrically around the outside of the exterior surface;
   d) a longitudinally oriented blade is mounted to a cutting assembly which in turn is mounted to the cutting assembly retainer, the cutting assembly rotates in unison with the cutting assembly retainer around the outside of the exterior surface of the slotted drum;
   e) such that the cutting assembly includes at least one guide cam configured to maintain a pre-selected stand-off gap between a cutting edge of the blade and a circumferential contour of the exterior surface of the drum such that plant material projecting through a slot and beyond the stand-off gap will be trimmed off by the rotating blade cutting edge.

2. The plant trimming assembly claimed in claim 1 further includes;
   i) at least two spaced apart guide cams mounted around the circumferential contour of the exterior surface of the drum; and
   ii) at least two spaced apart cam followers each mounted to a distal end of the cutting assembly; wherein upon rotation of the cutting assembly retainer, the cam followers maintain contact with their respective guide cam to continuously maintain the pre-selected stand-off gap between the cutting edge of the blade and the circumferential contour of the exterior surface of the drum.

3. The plant trimming assembly claimed in claim 2 wherein the guide cams are a flat band ring shaped strip guide cam with a flat inner side mounted to the circumferential contour of the exterior surface of the drum and a flat follower side for receiving the cam follower thereon.

4. The plant trimming assembly claimed in claim 3 wherein the cam followers are rollers one operably connected to a left cam adjusting mechanism and the other to a right cam adjusting mechanism, the cam adjusting mechanisms attached to the distal ends of the blade.

5. The plant trimming assembly claimed in claim 4 wherein the cutting assembly further includes a floating blade assembly which rigidly holds the blade, wherein the ends of the floating blade assembly are connected to the right and left cam adjusting mechanisms.

6. The plant trimming assembly claimed in claim 5 wherein the floating blade assembly includes a slotted blade support adjustably attached to a support holder with adjustment bolts for radially indexing the blade support relative to the support holder by turning the adjustment bolts, thereby selectively adjusting the blade longitudinal alignment which provides blade alignment with the longitudinal contour of the exterior surface of the drum.

7. The plant trimming assembly claimed in claim 6 wherein the cutting assembly retainer includes longitudinally spaced apart disk shaped cutting assembly holders, wherein the distance between two holders defines a segment which retains a cutting assembly there between, wherein the cutting assembly holders are held apart with longitudinally extending spacers.

8. The plant trimming assembly claimed in claim 7 wherein the cutting assembly retainer is divided into at least two segments along the length of the drum thereby decreasing the length of each blade to substantially one half of the length of the longitudinal contour of the drum, thereby increasing the number of adjustable blades along the length of the drum which improves the accuracy to align the blades with the longitudinal contour of the drum.

9. The plant trimming assembly claimed in claim 8 wherein each segment includes at least two cutting assemblies evenly spaced around the circumference of the drum.

10. The plant trimming assembly claimed in claim 9 wherein the right cam adjusting mechanism is attached to a right cutting assembly bracket to which a first quick release mechanism is attached, and the left cam adjusting mechanism is attached to a left cutting assembly bracket to which a second quick release mechanism is attached, the quick release mechanisms for quick releasable attachment of the cutting assembly to the cutting assembly holders which provides for quick replacement of the cutting assembly and therefore the blade.

11. The plant trimming assembly claimed in claim 10 wherein the cam adjusting mechanisms include a compression spring with one end of the spring operably attached to the support holder, and a threaded spring guide and a roller bracket which supports the roller, and the other end of the spring is operably attached to the cutting assembly bracket, wherein turning a spring guide nut about the threaded spring guide adjusts the stand-off distance between the blade cutting edge and the drum exterior surface such that undulations in the drum circumferential contour are followed by the roller cam thereby maintaining the preselected stand-off gap.

12. The plant trimming assembly claimed in claim 10 wherein the quick release mechanism includes a spring biased pin slid-ably attached to the cutting assembly bracket, the pin engages with a pin aperture in the cutting assembly holder and thereby release ably attaches the distal end of the cutting assembly to its respective cutting assembly holder.

13. The plant trimming assembly claimed in claim 1 wherein the drum is attached to the frame with drum bearings and the retainer is attached to the frame with retainer bearings.

14. The plant trimming assembly claimed in claim 1 wherein the blade is rigidly attached to and sandwiched between a blade backer and the adjustable blade support.

15. The plant trimming assembly claimed in claim 1 wherein the blade is angled at an angle theta relative to a tangent of the circumference of the exterior surface of the drum.

* * * * *